US008286362B2

(12) United States Patent
Petersheim

(10) Patent No.: US 8,286,362 B2
(45) Date of Patent: Oct. 16, 2012

(54) DEVICE FOR MEASURING SEAL GAPS OF VEHICLES

(75) Inventor: Matthew K. Petersheim, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 51 days.

(21) Appl. No.: 12/954,263

(22) Filed: Nov. 24, 2010

(65) Prior Publication Data
US 2012/0124853 A1    May 24, 2012

(51) Int. Cl.
*G01B 3/26* (2006.01)
*G01B 5/14* (2006.01)

(52) U.S. Cl. ............................ 33/613; 33/608; 33/542

(58) Field of Classification Search .............. 33/613, 33/600, 608, 542
See application file for complete search history.

(56) References Cited

U.S. PATENT DOCUMENTS

| | | | |
|---|---|---|---|
| 3,845,562 A | 11/1974 | Dallas | |
| 4,241,508 A * | 12/1980 | Cordner | 33/655 |
| 4,497,115 A * | 2/1985 | Dearman | 33/529 |
| 4,606,129 A * | 8/1986 | Barrowman et al. | 33/501.09 |
| 4,642,900 A * | 2/1987 | Provost et al. | 33/606 |
| 4,862,598 A * | 9/1989 | Barlow et al. | 33/613 |
| 4,918,827 A * | 4/1990 | Orsos | 33/836 |
| 4,930,226 A * | 6/1990 | Shindelar | 33/655 |
| 5,067,250 A | 11/1991 | Auweiler et al. | |
| 5,097,423 A * | 3/1992 | Badinger | 702/168 |
| 5,533,368 A | 7/1996 | Eagan | |
| 5,737,844 A | 4/1998 | Brumley | |
| 6,138,337 A * | 10/2000 | Lezuch et al. | 29/407.05 |
| 6,308,429 B1 * | 10/2001 | Green et al. | 33/542 |
| 7,080,461 B2 * | 7/2006 | Jensen et al. | 33/645 |
| 7,171,760 B1 * | 2/2007 | Lemon | 33/833 |
| 7,430,813 B2 * | 10/2008 | Park | 33/613 |
| 7,509,746 B1 | 3/2009 | Kozina et al. | |
| 7,727,238 B2 | 6/2010 | Seo et al. | |
| 2009/0216485 A1 | 8/2009 | Smith | |

FOREIGN PATENT DOCUMENTS

JP    2001048436    2/2001

* cited by examiner

Primary Examiner — Christopher Fulton
(74) Attorney, Agent, or Firm — Rankin, Hill & Clark LLP

(57) ABSTRACT

A device for measuring a seal gap created between a moving part and a mounting part of a vehicle body includes a base member, a scale member and a retaining member. The scale member is mounted to the base member and is moveable between an extended position and a retracted measured position. An indicator is provided on the base member for reading the scale member. The retaining member is coupled to the base member and engages the scale member for retaining the scale member in both the extended and measured positions relative to the base member. The base member is installed in the seal gap and is removably connected to one of the vehicle body parts. The scale member is moved to the extended position. The moving part is then closed relative to the mounting part, and the other of the vehicle body parts engages the scale member and moves the scale member to the measured position. The indicator together with the scale member provides a dimension of the seal gap.

18 Claims, 10 Drawing Sheets

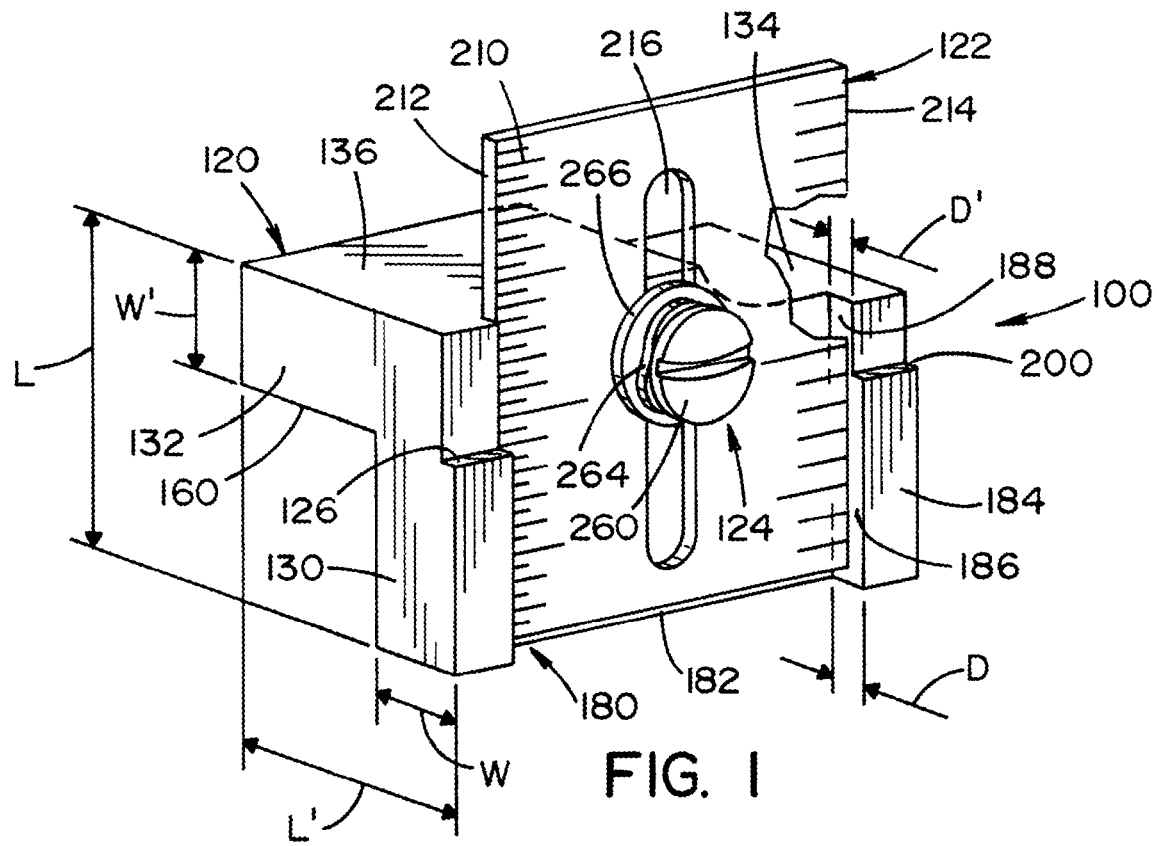

DEVICE FOR MEASURING SEAL GAPS OF VEHICLES

BACKGROUND

Exemplary embodiments herein generally relate to a device for measuring a seal gap of a vehicle. More particularly, the present disclosure relates to a flange mount measuring device that conveniently and accurately measures a vehicle seal gap.

Generally, a vehicle body is provided with various moving parts, for example, a trunk lid and a tailgate, as well as front and rear doors. The moving parts are mounted to fixed mounting parts of the vehicle body in such a way as to be openable and closeable. At the intersection between the two vehicle parts, gaps are inevitably formed between the moving parts and the fixed mounting parts of the vehicle body. Such gaps are generally referred to as seal gaps. The seal gaps provide the necessary clearance to prevent interference between the moving part and the mounting part. While a vehicle is driving, wind noise may be transmitted through the seal gaps into the vehicle. Moreover, when it rains, rainwater may flow through the seal gaps into the vehicle. Thus, in order to maintain the quietness and air tightness of the vehicle, various types of seals or weatherstrips are installed in seal gaps created between the moving parts and corresponding mounting parts of the vehicle body. When the weatherstrips are installed in the seal gaps, data on the exact dimensions of the respective seal gaps into which they are installed are required.

To this end, existing devices collect data about the seal gaps to verify that there is proper compression of the seal, when installed, to prevent wind noise and water leakage. Some known measuring devices fill the gap between the moving parts and the mounting parts of the vehicle body with resin or clay mold and measure the resulting molded part. In this case, the molded product may be deformed when it is removed, and thus it is difficult to measure precise dimensions. The accuracy of the collected data is also dependent on the skill of the worker who measures the seal gaps. When taking measurements with resin, the hardened piece may be difficult to remove from the seal gap as well. Further, it takes an excessively long time to measure the seal gaps because the resin product must be hardened; whereas, the compressed lump of clay must be sliced slowly and carefully before measuring. This slicing action can affect the measured value, reducing accuracy. It is also known to use a strain-based or other electrical gauge to measure the seal gaps. These devices require electronic data acquisition setup and sensor calibration prior to each use, which increases setup time.

BRIEF DESCRIPTION

In accordance with one aspect, a device for measuring an associated seal gap created between an associated moving part and an associated mounting part of an associated vehicle body comprises a base member, a scale member and a retaining member. The scale member is mounted to the base member and is moveable between an extended position and a retracted measured position. An indicator is provided on the base member for reading the scale member. The retaining member is coupled to the base member and engages the scale member for retaining the scale member in both the extended and measured positions relative to the base member. The base member is installed in the seal gap and is removably connected to one of the associated vehicle body parts. The scale member is moved to the extended position. The associated moving part is then closed relative to the associated mounting part, and the other of the associated vehicle body parts engages the scale member and moves the scale member to the measured position. The indicator together with the scale member provides a dimension of the seal gap.

In accordance with another aspect, a device for measuring an associated seal gap in an associated vehicle is provided. The seal gap lies between at least an associated frame portion, the frame portion defining an opening, and an associated openable member, the openable member being receivable in the opening for closure thereof. The device comprises a base member configured and dimensioned to be installed in the associated frame portion opening. The base member has a slide groove formed in a front surface thereof. A magnet is provided on the base member for releasably securing the base member to the associated frame portion. A scale member is slidably connected with the slide groove which guides the scale member between an extended position and a retracted measured position. The scale member is moveable to the measured position in response to an external force provided by engagement with the associated openable member. A retaining member is coupled to the base member and engages the scale member for retaining the scale member in both the extended and measured positions relative to the base member.

In accordance with yet another aspect, a device for measuring a seal gap created between an associated moving part and an associated mounting part of an associated vehicle body comprises a L-shaped base member installed in the seal gap. The base member has a slide groove formed in a front surface thereof. A magnet is provided on the base member for releasably securing the base member to one of the associated vehicle body parts. A scale member is slidably connected with the slide groove. The scale member is movable between an extended position and a retracted measured position in response to an external force provided by engagement with the other of the associated vehicle body parts. An indicator is integrally formed on the base member for reading the scale member.

BRIEF DESCRIPTION OF THE DRAWINGS

FIG. 1 is a front perspective view of a device for measuring a vehicle seal gap according to one aspect of the present disclosure, the device including a base member, a scale member and a retaining member.

FIG. 2 is a rear perspective view of the device of FIG. 1.

DETAILED DESCRIPTION

It should, of course, be understood that the description and drawings herein are merely illustrative and that various modifications and changes can be made in the structures disclosed without departing from the present disclosure. It will also be appreciated that the various identified components of the exemplary device for measuring vehicle seal gaps disclosed herein are merely terms of art that may vary from one manufacturer to another and should not be deemed to limit the present disclosure.

Figure 3:
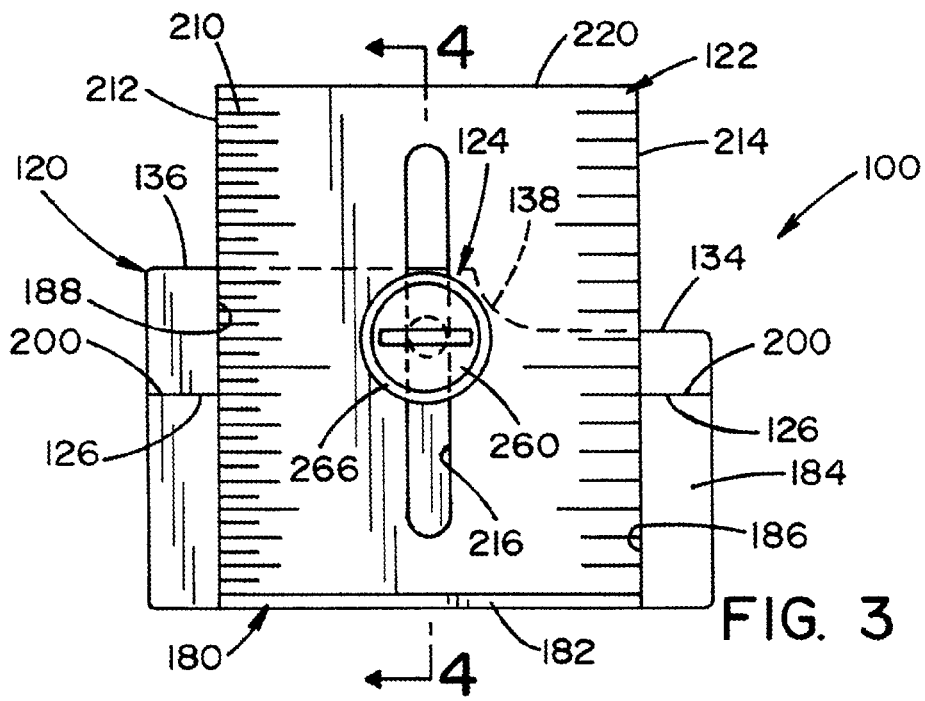
FIG. 3 is a front view of the device FIG. 1.
Figure 5:
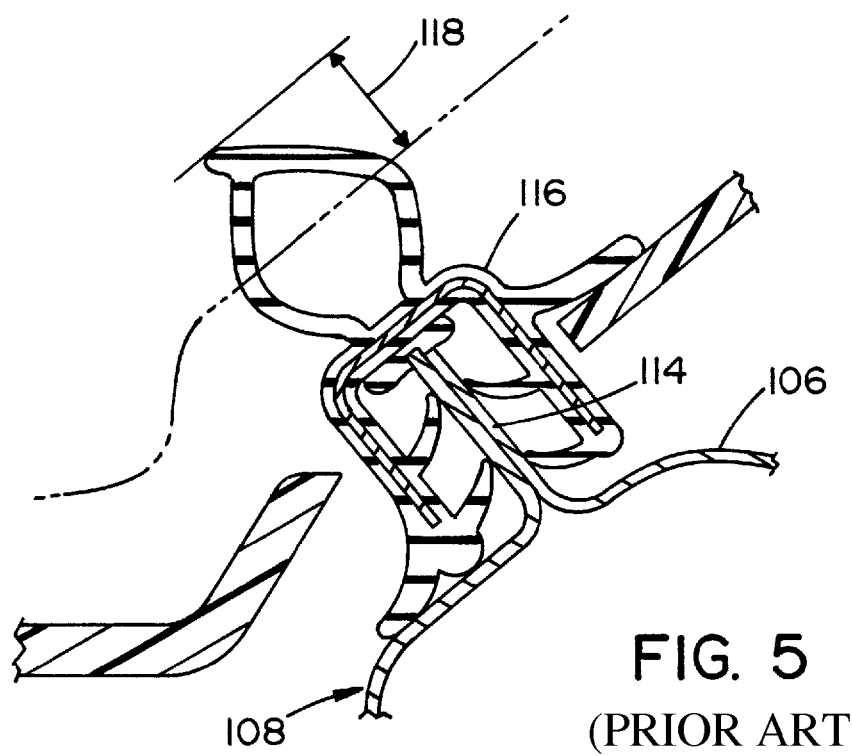
FIG. 5 is a cross-sectional view depicting a seal interface of a weatherstrip mounted on a mounting part of a vehicle body.
Figure 6:
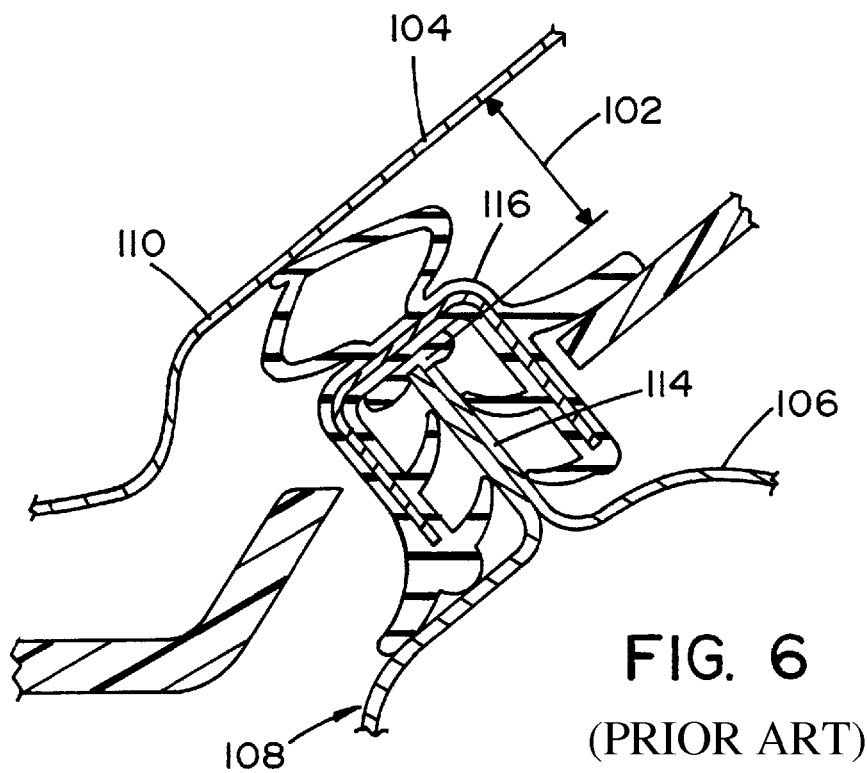
FIG. 6 is a cross-sectional view depicting the weatherstrip of FIG. 5 compressed by a moving part of a vehicle body, the compressed weatherstrip providing a dimension of a seal gap between the moving part and the mounting part.

Referring now to the drawings, wherein like numerals refer to like parts throughout the several views, FIGS. 1-3 illustrate an exemplary device 100 for measuring a seal gap 102 created between a moving part 104 and a mounting part 106 of a vehicle body 108 (FIGS. 5 and 6) according to one aspect of the present disclosure. As shown, the moving part 104 can be a tailgate structure 110 (FIG. 6), a door structure 112 (FIG. 8) and the like. As shown in FIGS. 5 and 6, the mounting part 106 can be a body structure having a body flange 114 onto which a seal or weatherstrip 116 may be installed. To function correctly, the weatherstrip 116 is set to the design range of seal interference 118. This interference compresses the seal when the moving part 104 is closed to isolate the interior from the exterior of the vehicle. Seal interference 118 is generally confirmed by removing the perimeter weatherstrip 116, then measuring the seal gap 102, which is substantially equal to the compressed height of the seal. As mentioned previously, the seal gap 102 is critical to guarantee that noise and weather do not enter the vehicle. The amount of force required to close the trunk or tailgate is also affected by the seal gap 102.

Figure 4:
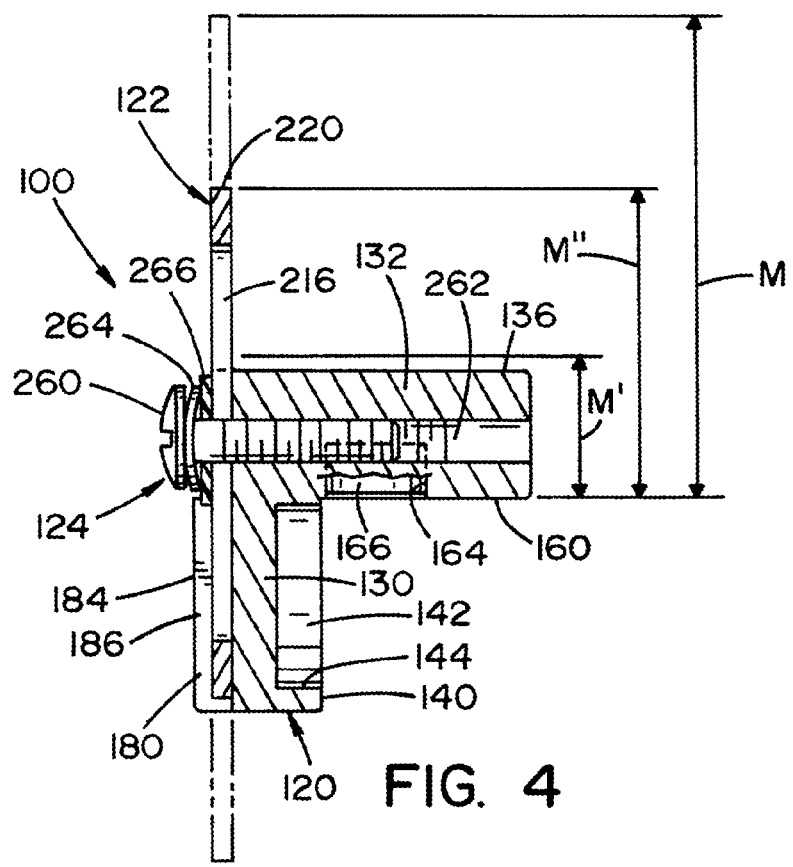
FIG. 4 is a cross-sectional view of the device of FIG. 3 taken along line 4-4 of FIG. 3.
Figure 7:
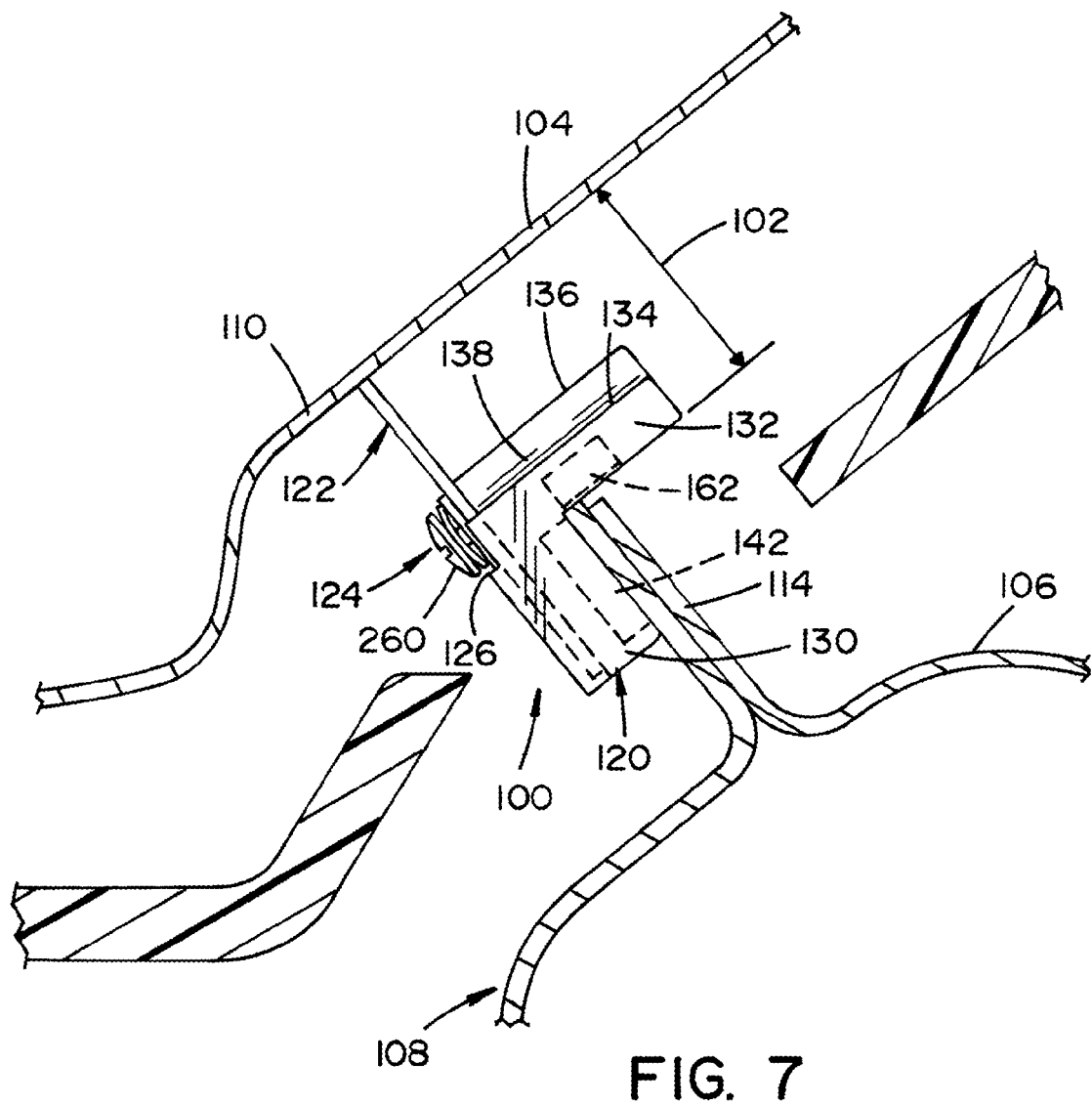
FIG. 7 schematically depicts the device of FIG. 1 mounted on the mounting part of FIG. 6, the device measuring the seal gap.
Figure 8:
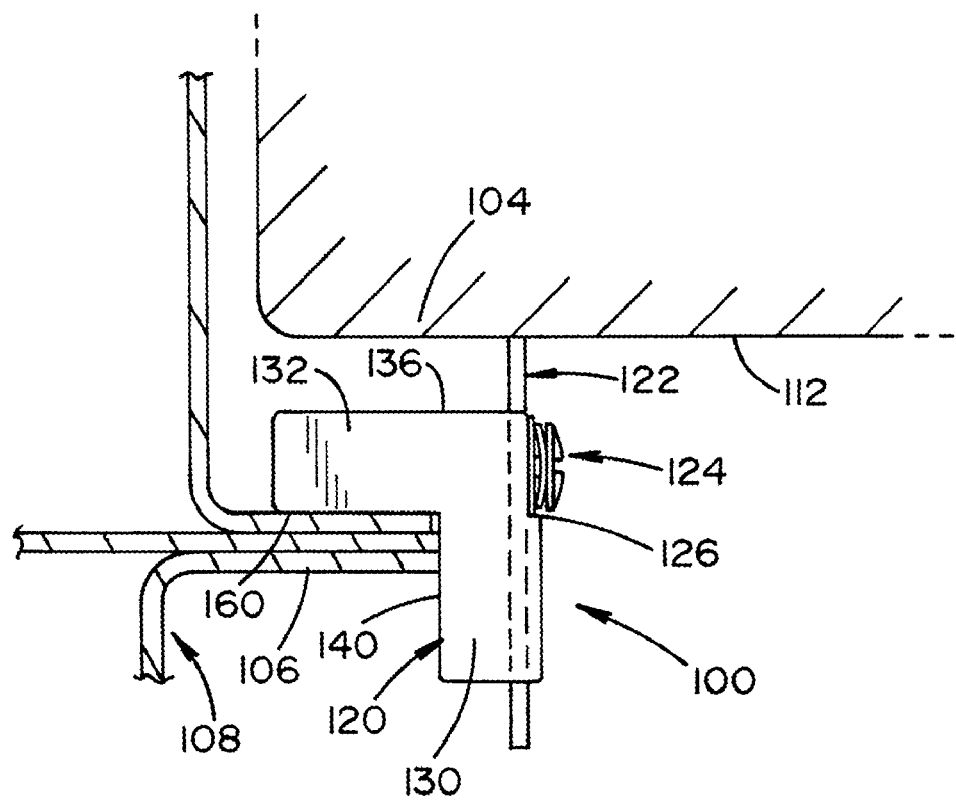
FIG. 8 schematically depicts the device of FIG. 1 mounted on another mounting part of the vehicle body, the device measuring the seal gap between this mounting part and another moving part.

As depicted in FIG. 4, the device 100 can accommodate a wide range of measurement. A large maximum measurement M is desirable to set assemblies with thick seals. A small minimum measurement M' is desirable for thin seals and to prevent damage from, for example, tailgates or trunks incorrectly set too close to the body mounting part 104 prior to measurement. A medium measurement M" is also provided. This wide range of measurement is desirable for testing to identify performance effects of incorrectly setting the seal gap 102 and to set the design range of seal interference 118. Further, and as shown in FIGS. 7 and 8, the seal gap measurement device 100 is compact in order to fit in the space-restricted area of the removed weatherstrip 116.

With reference back to FIGS. 1-3, the measuring device 100 generally comprises a base member 120, a scale member 122 and a retaining member 124. The scale member 122 is mounted to the base member 120 and is moveable between an extended position (for example, extended for the large maximum measurement M) and a retracted measured position (shown in FIGS. 7 and 8) in response to an external force provided by one of the vehicle body parts 104,106. An indicator 126 is provided on the base member 120 for reading the scale member 122. The retaining member 124 is coupled to the base member 120 and engages the scale member 122 for retaining the scale member in both the extended and measured positions relative to the base member. As will be described in greater detail below, in use the device 100 is installed in the seal gap 102. The base member 120 is removably connected to one of the vehicle body parts 104,106. The scale member 122 is moved to the extended position. The moving part 104 is then closed relative to the mounting part 106, and the other of the vehicle body parts engages the scale member 122 and moves the scale member to the measured position. The indicator 126 together with the scale member 122 provides a dimension of the seal gap 102.

With particular reference to FIGS. 1 and 2, the base member 120 of the measuring device 100 is generally L-shaped and includes a first portion 130 and a second portion 132 which extends generally perpendicularly from the first portion 130. According to one aspect, the dimensions of the first portion are substantially equal to the dimensions of the second portion. More particularly, the first portion 130 includes a length L and width W and the second portion 132 includes a length L' and width of the W', the length and width of the first portion 130 being substantially equal to the length and width of the second portion 132. This dimensioning of the measuring device 100 allows the measuring device 100 to be used on differing vehicle body parts 104,106 for quickly and accurately measuring the seal gap 102. In the illustrated exemplary embodiment, the second portion 132 includes an offset section 134 spaced inwardly from a top surface 136 of the second portion; although, this is not required. A curved wall 138 separates the offset section 134 from the top surface 136. The offset section 134 together with the curved wall 138 allows the measuring device 100 to be easily gripped by a user.

Each of the first and second portions 130,132 includes at least one magnet for releasably connecting at least one of the first and second portions to one of the vehicle body parts 104,106. As shown in FIGS. 2 and 4, a rear surface 140 of the first portion 130 includes at least one magnet 142 for connecting the base member 120 to one of the vehicle body parts 104,106. The at least one magnet 142 is located in at least one pocket 144 provided on the rear surface 140. The at least one pocket is dimensioned to receive the at least one magnet such that an outer surface of the at least one magnet 142 once positioned in the at least one pocket 144 is generally contiguous with the rear surface 140 of the first portion 130. As shown, the rear surface 140 includes a pair of spaced apart magnets 142, each magnet being secured in a pocket 144. Each magnet 142 can be cylindrically shaped and is located near one of the end portions 150,152 of the rear surface. This provides a central portion 154 of the rear surface 140 without a magnet. Further, in the depicted exemplary embodiment, a diameter of each magnet 142 is slightly less than a width of the rear surface 140; although, this is not required. It should be appreciated that the rear surface 140 can be provided with more than the depicted two magnets, the magnets being appropriately sized to span across the rear surface 140.

Similar to rear surface 140, and with continued reference to FIGS. 2 and 4, a rear surface 160 of the second portion 132 includes at least one magnet 162 for connecting the base member 120 to one of the vehicle body parts 104,106. The at least one magnet 162 is located in at least one pocket 164 provided on the rear surface 160. The at least one pocket is dimensioned to receive the at least one magnet such that an outer surface of the at least one magnet 162 once positioned in the at least one pocket 164 is slightly recessed from the rear surface 160 of the second portion 132. This allows the rear surface 160 to be properly positioned on one of the vehicle body parts 104,106 for accurate measurement of the seal gap 102. As shown, the rear surface 160 includes four spaced apart magnets 162, each magnet being secured in a pocket 164. Similar to magnet 142, each magnet 162 can be cylindrically shaped; although, this is not required. A first pair of magnets 162 is located near one end portion 170 of the rear surface 160 and a second pair of magnets 162 is located near the other end portion 172 of the rear surface. This again provides a central portion 174 of the rear surface 160 without a magnet. Further, in the illustrated exemplary embodiment, a diameter of each magnet 162 is about one-half a width of the rear surface 160, and each magnet 162 is located adjacent the rear surface 140. Again, it should be appreciated that the rear surface 160 can be provided with more or less than the depicted four magnets. It should also be appreciated that the size of the magnets 162 can be larger than the depicted size. For example, the magnets 162 can have a size generally equal to the size of magnets 142. In this case, the rear surface 160 can have a configuration similar to rear surface 140 and would include two larger magnets.

With reference to FIGS. 1 and 3, a slide groove 180 is formed on a central portion 182 of a front surface 184 of the base member 120. The slide groove 180 extends along the entire length L of the first portion 130, and is sized to slidably receive the scale member 122. The slide groove 180 guides the scale member between the extended position and the measured position. The slide groove 180 includes a lower section 186 and an upper section 188. The lower section 186 has a depth D slightly greater than a depth D' of the upper section 188. The indicator 126 is at least partially defined by this offset in the depth of the slide groove 180, which is aligned with the rear surface 160 of the second portion 132. More particularly, the offset defines a shelf 200 which extends inwardly from and perpendicular to the front surface 184 of the base member. This shelf 200 integrally formed on the base member 120 lies in the same plane defined by the rear surface 160 of the second portion 132 (i.e., is coplanar with the rear surface) and at least partially defines the indicator 126 for reading the scale member 122.

Figure 9:
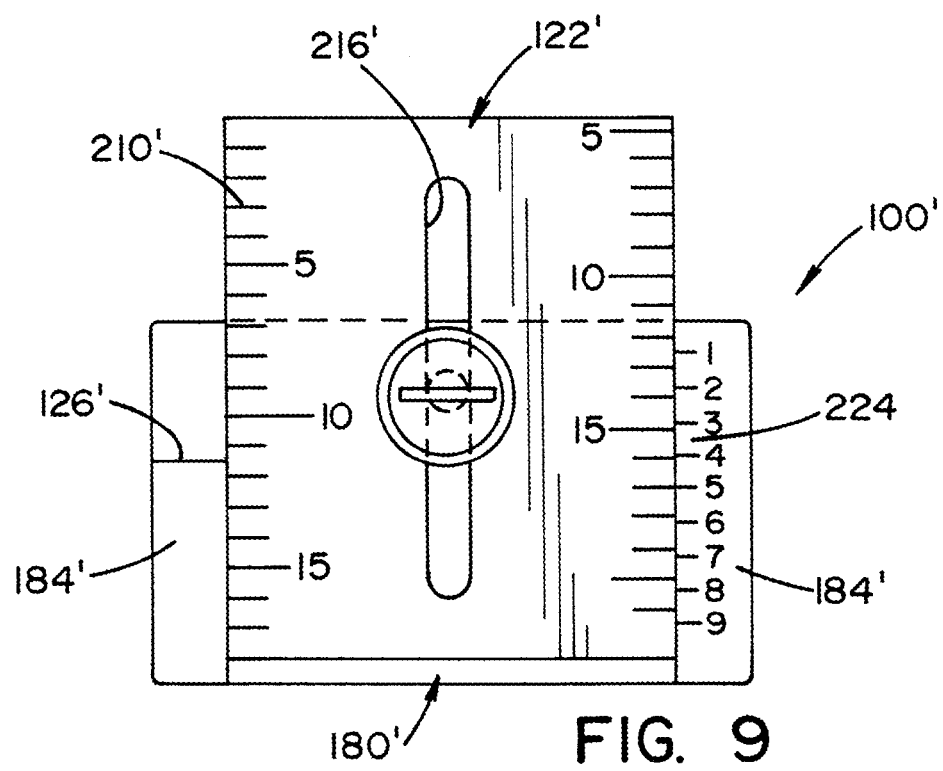
FIG. 9 is a front view of the device of FIG. 1 including a scale member according to another aspect of the present disclosure.

As shown in FIG. 3 the scale member 122 is generally rectangular-shaped and includes a graduated scale 210 on at least one of its elongated sides 212,214. An elongated slot 216 is provided in a central portion of the scale member 122. The length of the elongated slot 216 at least partially defines the extended position and minimum measured position of the scale member 122 relative to the base member 120. A generally flat end 220 of the scale member 122 can be used for vehicle body parts 104,106 having generally flat engaging surfaces. Another scale member 122' for use with a measuring device 100' is depicted in FIG. 9. This scale member 122' also includes a graduated scale 210' on each of its elongated sides and an elongated slot 216'. An indicator 126' is provided on one side of the front surface 184'. For precise measurements, a vernier 224 is provided on the other side of the front surface 184' adjacent the slide groove 180'. As such, the measuring device 100' does not include an offset section. With this embodiment, the indicator 126' and one of the graduated scales provide a first measurement and the vernier 224 and the other graduated scale provide a more precise measurement.

Figure 10:
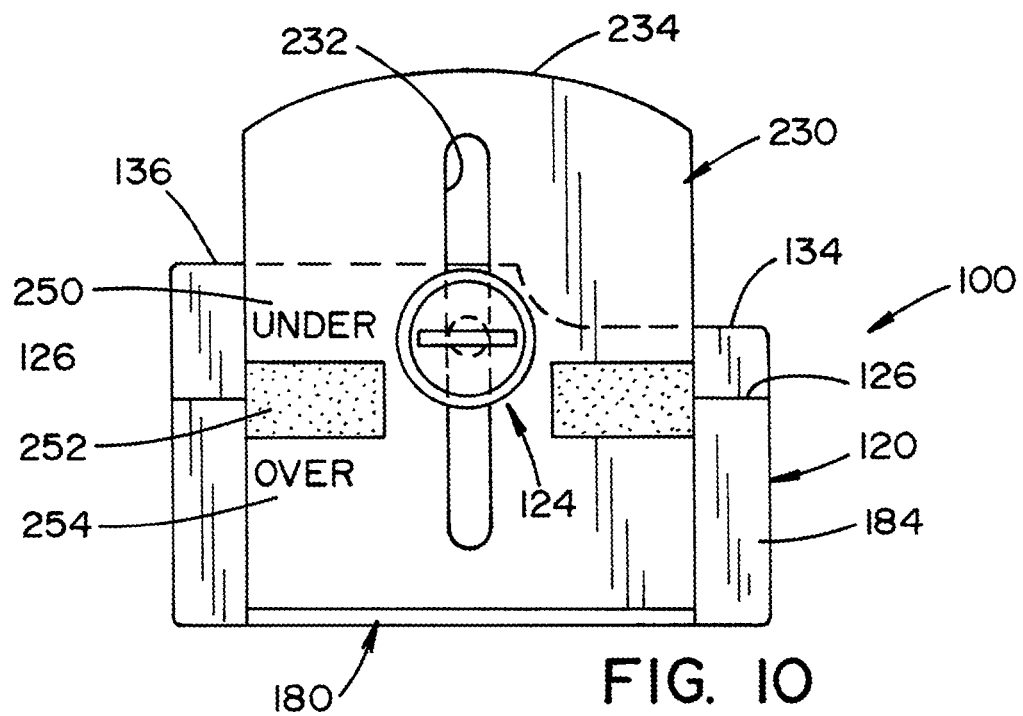
FIG. 10 is a front view of the device of FIG. 1 including a scale member according to yet another aspect of the present disclosure.

For vehicle body parts having uneven engaging surfaces, scale member 230 for use with the measuring device 100 is provided. As shown in FIG. 10, this scale member 230 also includes an elongated slot 232 for limiting movement of the scale member relative to the base member 120, but has a curved or rounded end 234. However, in lieu of a graduated scale on at least one of its elongated sides, scale member 230 is separated into separate regions, namely an undersize seal gap region 250, a correct seal gap region 252 and an oversize seal gap region 254. The regions can be color-coded to allow a user to easily determine the dimension of the seal gap 102. It should be appreciated that a curved or rounded end can also be provided on one of the scale members 122,122' having the graduated scale.

The scale member 122 is slidably connected with the slide groove 180 via the retaining member 124. In the depicted embodiment of FIGS. 1-4, the retaining member 124 includes a threaded fastener 260 which extends through the elongated slot 216 and threadingly engages an aperture 262 located on the front surface 184 of the base member 120. The aperture 262 can extend through the second portion 132 of the base member 120. A spring washer 264 and a washer 266 can be provided between the fastener 260 and the scale member 122. The fastener 260 provides the necessary friction to retain the scale member 122 in the measured position for viewing.

Figure 11:
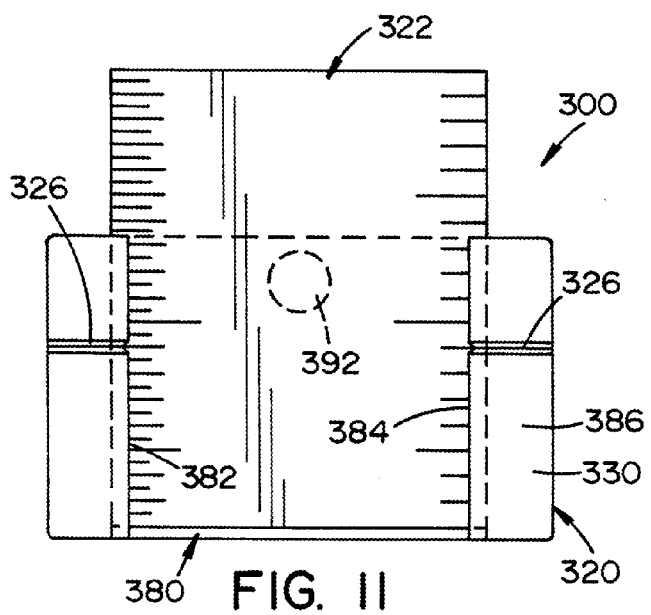
FIG. 11 is a front view of a device for measuring a vehicle seal gap according to another aspect of the present disclosure, the device including a base member, a scale member and a retaining member.
Figure 12:
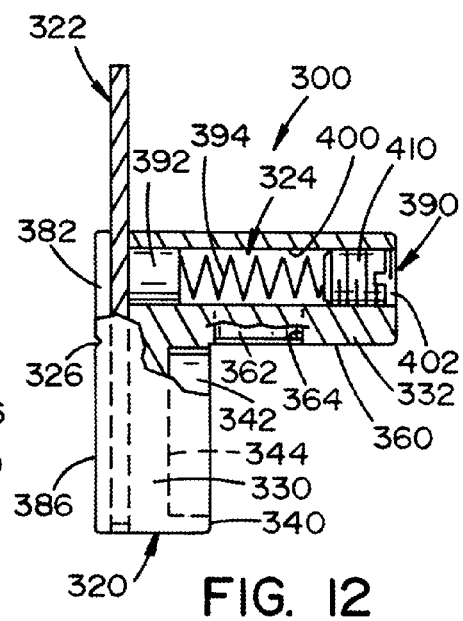
FIG. 12 is a side view, partially broken away, of the device of FIG. 11.
Figure 13:
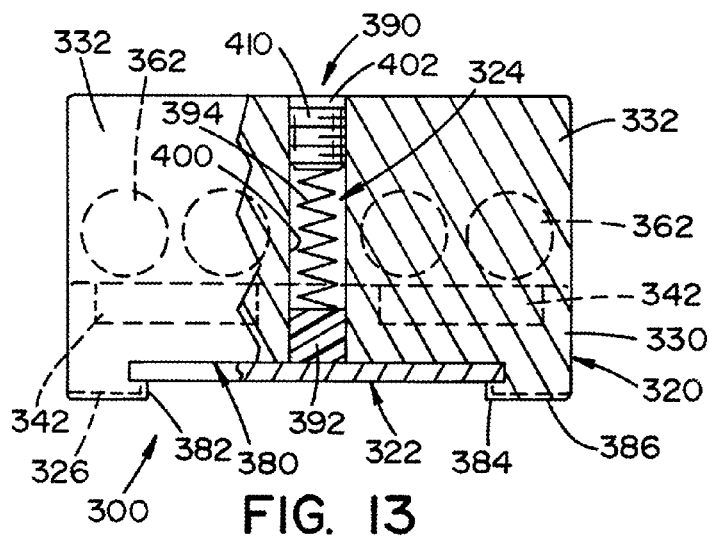
FIG. 13 is a top plan view, partially broken away, of the device FIG. 11.

With reference now to FIGS. 11-13, a device 300 for measuring the seal gap 102 according to another exemplary embodiment is provided. Similar to measuring device 100, the measuring device 300 includes a base member 320, a scale member 322 moveably connected to the base member via a retaining member 324, which engages the scale member 322 for retaining the scale member 322 in both the extended and measured positions relative to the base member 320, and an indicator 326 for reading the scale member 322. The base member 320 is generally L-shaped and includes a first portion 330 and a second portion 332. A rear surface 340 of the first portion 330 includes at least one magnet 342 for connecting the base member 320 to one of the vehicle body parts 104, 106. The at least one magnet 342 is located in at least one pocket 344 provided on the rear surface 340. A rear surface 360 of the second portion 332 includes at least one magnet 362 for connecting the base member 320 to one of the vehicle body parts 104,106. The at least one magnet 362 is located in at least one pocket 364 provided on the rear surface 360.

A slide groove 380 and lips 382,384 are formed on a front surface 386 of the base member 320. The scale member 322 is slidably connected with the slide groove 380 which guides the scale member 322 between an extended position and a retracted measured position. The lips 382,384 secure the scale member within the slide groove. The indicator 326 is provided on the front surface 386 of the base member 320.

As depicted, the retaining member 324 is at least partially housed within the base member 320 and includes a plunger assembly 390 having a plunger 392 and a biasing means 394 for urging the plunger into engagement with a rear surface of the scale member 322. The plunger assembly 390 is housed within a bore 400 provided in the second portion 332 of the base member 320. An end portion 402 of the bore 400 can be threaded which allows a set screw 410 to threadingly engage the bore 400. Tightening of the set screw 410 within the bore 400 pushes the plunger 392 against the scale member 322, which in turn, provides the necessary friction to hold the scale member in position. With this configuration of the retaining member 324, no elongated slot is required for the scale member 322.

With reference now to FIGS. 14-18, a device 500 for measuring the seal gap 102 according to yet another exemplary embodiment is provided. As indicated previously, the seal gap 102 lies between the openable member 104 and the frame portion 106 (FIG. 6). The frame portion 106 defines an opening and the openable member 104 is receivable in the opening for closure thereof. Similar to measuring device 100,300, the device 500 includes a base member 520, a scale member 522 moveably connected to the base member via a retaining member 524, which engages the scale member 522 for retaining the scale member 522 in both the extended and measured positions relative to the base member 520, and an indicator 526 for reading the scale member 522.

The base member 520 is configured and dimensioned to be installed in the frame portion opening. Particularly, the base member 520 is generally L-shaped and includes a first portion 530 and a second portion 532. A rear surface 540 of the first portion 530 includes at least one magnet 542 for connecting the base member 520 to one of the vehicle body parts 104, 106. The at least one magnet 542 is located in at least one pocket 544 provided on the rear surface 540. As shown, the rear surface 540 includes a first pair of spaced apart magnets and a second pair of spaced apart magnets. The first pair of magnets is located near one end portion 550 of the rear surface 540 and the second pair of magnets is located near the other end portion 552 of the rear surface. A rear surface 560 of the second portion 532 includes at least one magnet 562 for connecting the base member 520 to one of the vehicle body parts 104,106. The at least one magnet 562 is located in at least one pocket 564 provided on the rear surface 560.

A slide groove 580 is formed on a front surface 584 of the base member 520 and extends along the entire length of the first portion 530. The scale member 522 is slidably connected with the slide groove 580 which guides the scale member 522 between an extended position and a retracted measured position. The scale member is moveable to the measured position in response to an external force provided by engagement with the openable member 104. The indicator 526 is provided on the front surface 584 of the base member 520.

As depicted in FIGS. 14-18, the retaining member 524 is at least partially housed within the base member 520 and includes a spring-biased engagement member which is urged into engagement with the scale member 522. Particularly, the retaining member 524 includes a release button assembly 590 having an engaging member 592 and a release button 594 connected to the engaging member. The engaging member 592 includes a head 600 and a stem 602 projecting from the head. The head 600 is sized larger than an elongated slot 616 provided on the scale member 522. A washer 618 can be provided between the head 600 and the scale member 522. The stem 602 extends through a bore 620 provided in the base member 520. As shown, the bore extends through the second portion 532. An end of the bore 620 is sized to receive a first end portion of the release button 594, which has an opening 626 for threadingly receiving a threaded end of the stem 602. A second end portion of the release button 594 projects outwardly from the second portion 532. A biasing means 630 is provided between the engaging member 592 and the release button 594 within the bore 620 for urging the head 600 of the engaging member 592 into engagement with a front surface of the scale member 522.

Figure 14:
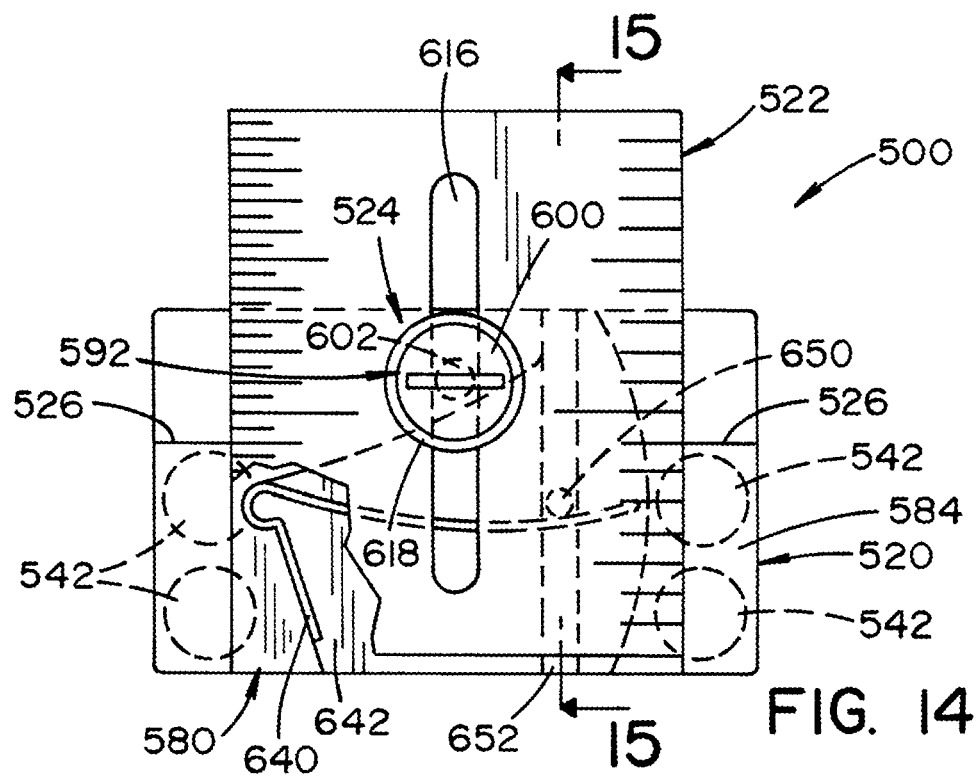
FIG. 14 is a front view, partially broken away, of a device for measuring a vehicle seal gap according to yet another aspect of the present disclosure, the device including a base member, a scale member and a retaining member.
Figure 15:
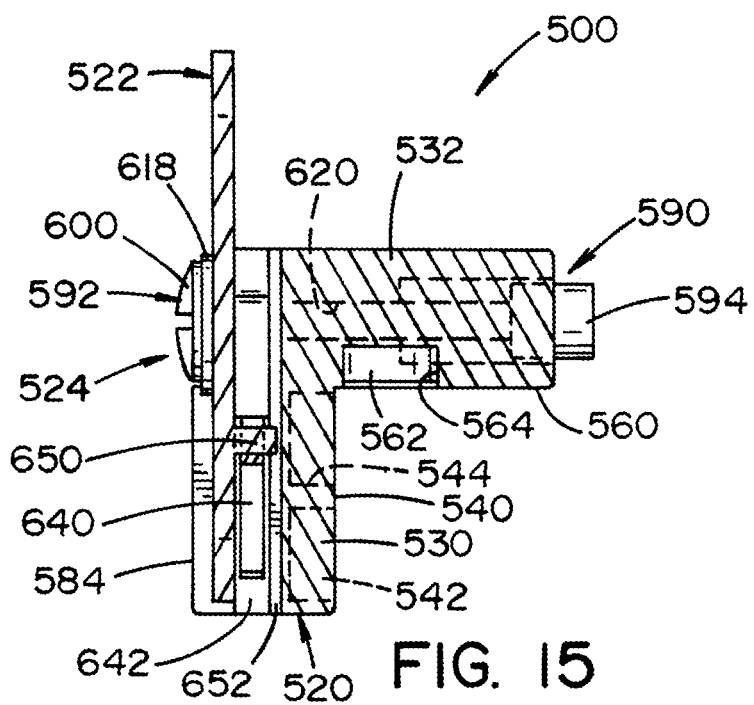
FIG. 15 is a cross-sectional view of the device of FIG. 14 taken along line 15-15 of FIG. 14.
Figure 16:
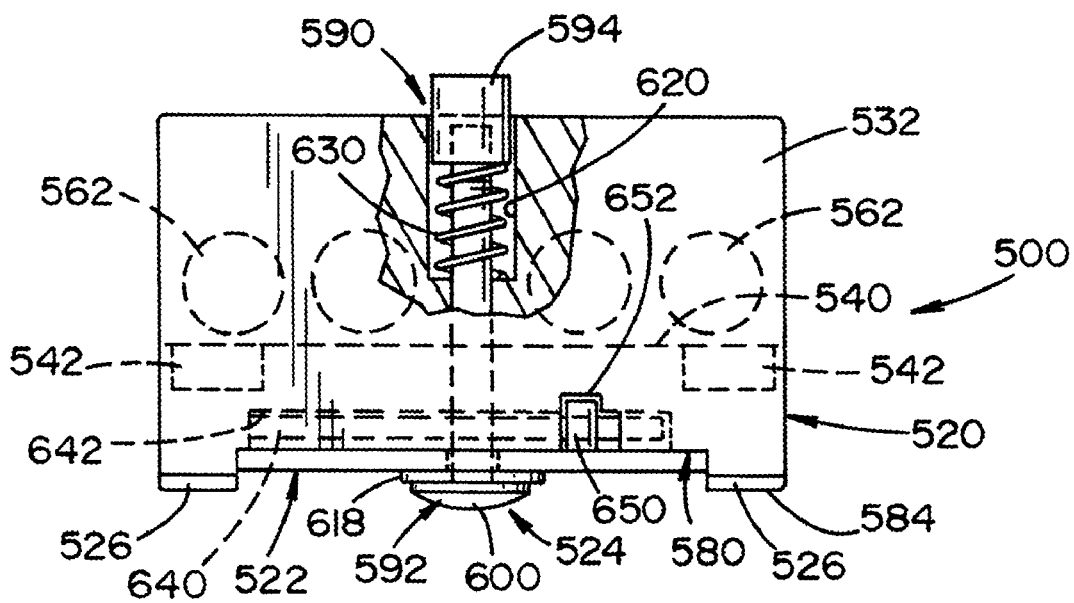
FIG. 16 is a top plan view, partially broken away, of the device FIG. 14.
Figure 17:
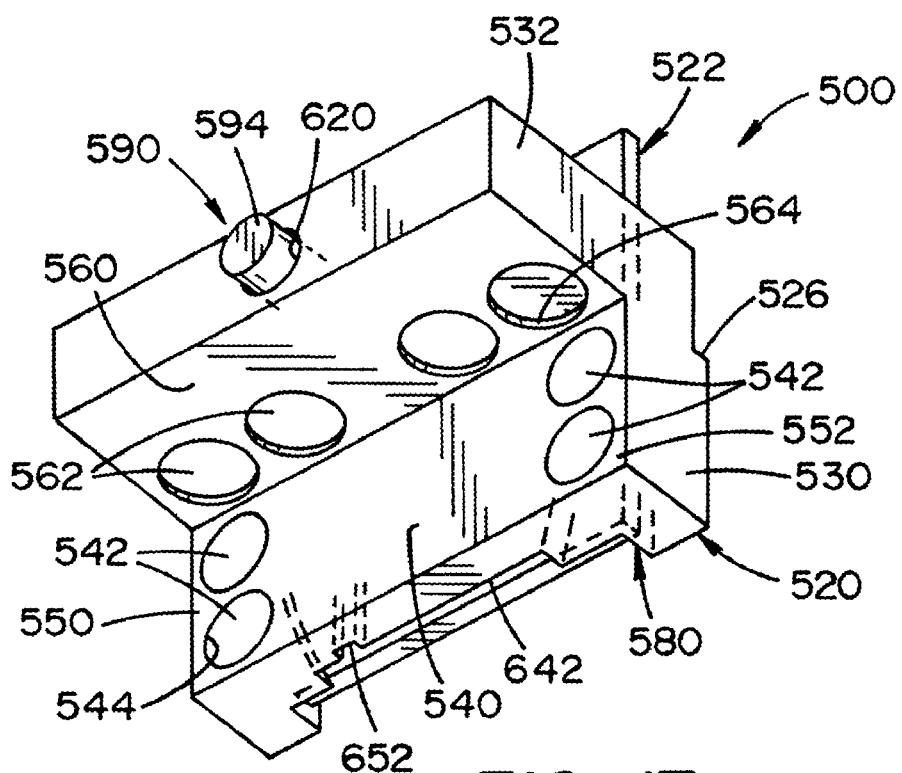
FIG. 17 is a rear perspective view of the device of FIG. 14.
Figure 18:
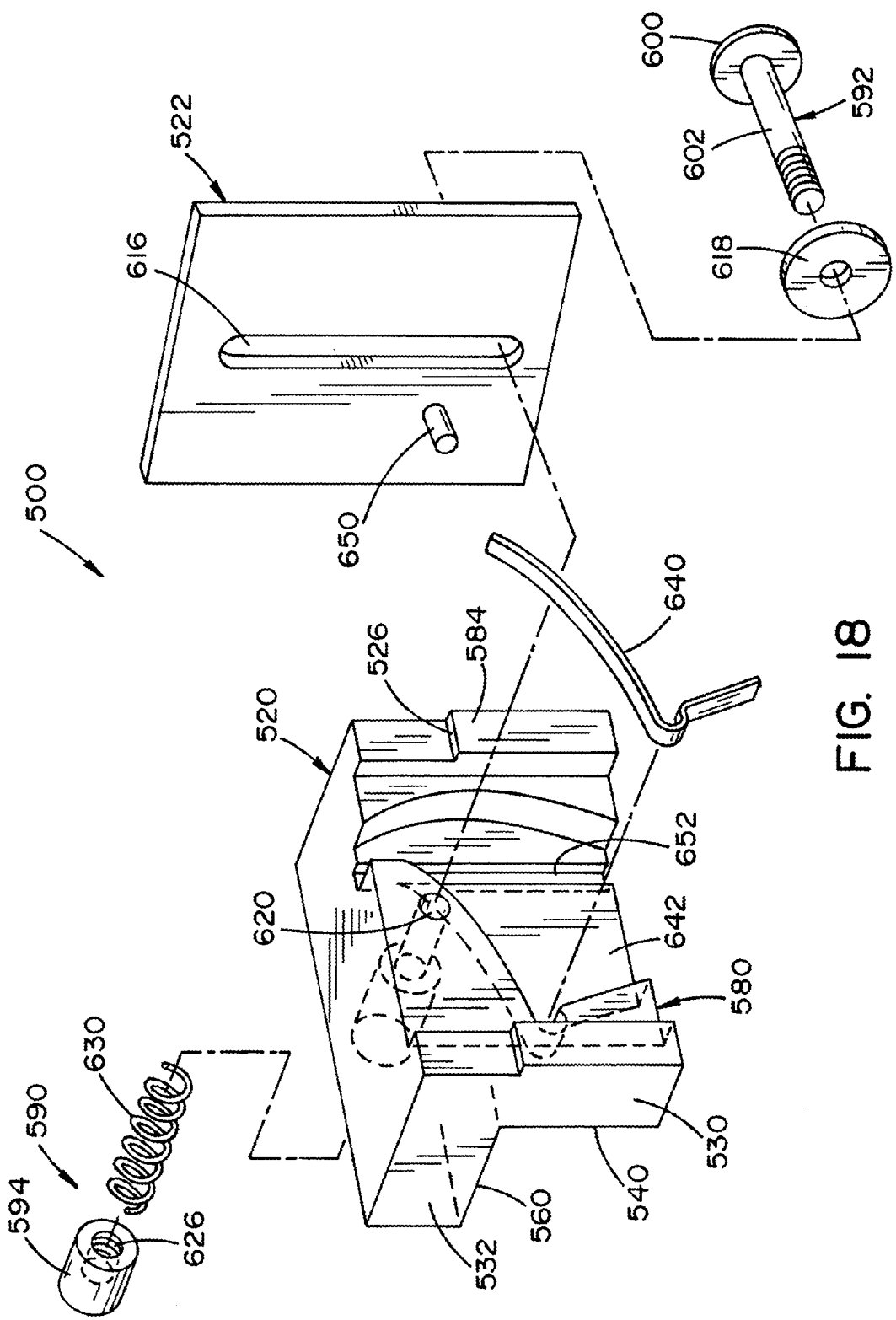
FIG. 18 is an exploded perspective view of the device of FIG. 14.

With reference to FIGS. 14 and 18, a second biasing member 640 is also provided on the base member 520 for automatically moving the scale member 522 to the extended position upon release of the retaining member 524 from the scale member. In the illustrated embodiment, the second biasing member is a cantilever-type spring which is housed in a pocket 642 located in the base member 520 behind the scale member 522. A pin 650 is provided on a rear surface of the scale member 522 and is slidable within a groove 652 extending along the length of the base member 520. The second biasing member 640 is operably engaged to the pin 650 for automatically returning the scale member 522 to the extended position. More particularly, as the scale member 522 is moved to its measured position, the pin 650 engages an end portion of the second biasing member 640. The retaining member 524 retains the scale member 522 in the measured position. To release the scale member, the release button 594 is pressed which moves the head 600 of the engagement member 592 away from the scale member. The second biasing member 640 then moves back to its initial position, which, in turn, returns the scale member 522 to its extended position.

As is evident from the forgoing, the present invention provides a simple mechanical device 100,300,500 with a scale member 122,322,522 for quickly and accurately measuring the seal gap 102. The device includes the L-shaped base member 120,320,520 to fit against a seal flange (i.e., the fixed mounting part 106). The slide groove 180,380,580 is located in the base member 120,320,520 to provide a guide for the scale member 122,322,522. The retaining member 124,324, 524 provides the necessary friction to retain the measurement for viewing. The indicator 126,326,526 formed on the base member provides a simple readout of the measurement. In use, the base member 120,320,520 is releasably attached to the seal flange 106, and the scale member is moved to the extended position toward the tailgate structure 110 (FIG. 7), door structure 112 (FIG. 8) and the like. Closing of the structure engages the scale member and moves the scale member toward the seal flange 114, which allows for measurement of the seal gap 102.

The measuring device 100,300,500 of the present disclosure conveniently and precisely measures the dimensions of the seal gap 102 defined between the moving part 104 and the mounting part 106 so that the tolerance of the seal gap 102 can be more precisely and accurately controlled. Thus, a weatherstrip 116 having a proper sectional area or a proper cross-section can be installed at the proper position. Additionally, wind noise generated while a vehicle is driving is efficiently kept out, thus keeping the interior of the vehicle quiet and improving the sealing ability of the moving part 104 relative to the mounting part 106 of the vehicle body.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A device for measuring an associated seal gap created between an associated moving part and an associated mounting part of an associated vehicle body, the device comprising:
  a base member;
  a scale member mounted to the base member and moveable between an extended position and a retracted measured position;
  an indicator provided on the base member for reading the scale member; and
  a retaining member coupled to the base member and engaging the scale member for retaining the scale member in both the extended and measured positions relative to the base member,
  wherein the base member is configured to be installed in the associated seal gap and removably connected to one of the associated vehicle body parts and the scale member is moved to the extended position, the associated moving part is then closed relative to the associated mounting part, the other of the associated vehicle body parts engaging the scale member and moves the scale member to the measured position, the indicator together with the scale member providing a dimension of the associated seal gap, wherein the base member includes a slide groove, the scale member being slidably connected with the slide groove via the retaining member, the slide groove guiding the scale member between the extended position and the measured position, wherein a front surface of the base member includes at least one inwardly extending shelf, a top surface of the shelf being perpendicular to the front surface, parallel to a top surface of the base member, and at least partially defining the indicator.

2. The device of claim 1, wherein the base member is L-shaped and includes a first portion and a second portion extending perpendicularly from the first portion.

3. The device of claim 2, wherein a front surface of the first portion of the base member includes the indicator, the indicator being aligned with a rear surface of the second portion.

4. The device of claim 2, wherein a rear surface of the first portion includes at least one pocket dimensioned to receive at least one magnet for connecting the base member to one of the associated vehicle body parts, an outer surface of the magnet once positioned in the pocket is generally contiguous with the rear surface of the first portion.

5. The device of claim 2, wherein a rear surface of the second portion includes at least one pocket dimensioned to receive at least one magnet for connecting the base member to one of the associated vehicle body parts, an outer surface of the magnet once positioned in the pocket is recessed from the rear surface of the second portion to ensure measurement accuracy.

6. The device of claim 1, wherein the retaining member includes a threaded fastener which is threadingly engaged with an aperture located on the base member, the fastener providing the necessary friction to retain the scale member in the measured position for viewing.

7. The device of claim 1, wherein the retaining member includes a release button assembly having an engaging member, a release button connected to the engaging member and a biasing means provided between the engaging member and the release button for urging the engaging member into engagement with a front surface of the scale member.

8. The device of claim 1, wherein the retaining member includes a plunger assembly having a plunger and a biasing means for urging the plunger into engagement with a rear surface of the scale member.

9. The device of claim 1, wherein the indicator includes a vernier provided on the base member.

10. A device for measuring an associated seal gap in an associated vehicle, wherein the seal gap lies between at least an associated frame portion, the frame portion defining an opening, and an associated openable member, the openable member being receivable in the opening for closure thereof, the device comprising:

a base member configured and dimensioned to be installed in the associated frame portion opening, the base member including a first portion and a second portion extending perpendicularly from the first portion, the base member having a slide groove formed in a front surface of the first portion which extends an entire longitudinal length of the first portion;

at least one magnet provided on the base member for releasably securing the base member to the associated frame portion;

a scale member slidably connected with the slide groove which guides the scale member between an extended position and a retracted measured position, the scale member having a longitudinal length greater than the longitudinal length of the first portion and being moveable to the retracted measured position in response to an external force provided by engagement with the associated openable member; and retaining member coupled to the base member and engaging the scale member for retaining the scale member in both the extended and measured positions relative to the base member, wherein a front surface of the first portion includes an indicator for reading the scale member, the indicator being parallel to a top surface of the second portion and aligned with a bottom surface of the second portion.

11. The device of claim 10, wherein the at least one magnet includes a first magnet and a second magnet, each of the first portion and the second portion including a pocket for receiving one of the first magnet and second magnet.

12. The device of claim 10, wherein the front surface of the first portion includes an inwardly extending shelf, a top surface of the shelf being perpendicular to the front surface and coplanar to the bottom surface of the second portion, the shelf at least partially defining the indicator.

13. The device of claim 10, wherein the scale member includes an elongated slot and the retaining member includes a threaded fastener which extends through the elongated spot and threadingly engages an aperture located on the base member, the fastener providing the necessary friction to retain the scale member in the measured position for viewing.

14. The device of claim 10, wherein the retaining member includes a spring-biased engagement member at least partially housed within the base member and urged into engagement with the scale member.

15. The device of claim 10, further including a biasing member for automatically moving the scale member to the extended position upon release of the retaining member from the scale member.

16. A device for measuring a seal gap created between an associated moving part and an associated mounting part of an associated vehicle body, comprising:

an L-shaped base member installed in the seal gap, the base member having a slide groove formed in a front surface thereof;

at least one magnet provided on the base member for releasably securing the base member to one of the associated vehicle body parts;

a scale member slidably connected with the slide groove, the scale member movable between an extended position and a retracted measured position in response to an external force provided by engagement with the other of the associated vehicle body parts; and an indicator integrally formed on the base member for reading the scale member, wherein the base member includes a first portion and a second portion extending perpendicularly from the first portion, the first portion including a length and width and the second portion including a length and width, the length and width of the first portion being substantially equal to the length and width of the second portion thereby allowing the measuring device to be used on the differing associated vehicle body parts for quickly and accurately measuring the seal gap.

17. The device of claim 16, further including a retaining member coupled to the base member and engaging the scale member for retaining the scale member in both the extended and measured positions relative to the base member.

18. The device of claim 16, wherein the at least one magnet includes a first magnet and a second magnet, each of the first portion and the second portion including a pocket for receiving one of the first magnet and the second magnet, wherein a front surface of the first portion at least partially defines the indicator, the indicator being aligned with a rear surface of the second portion.

* * * * *